Fig_4

Fig_5

Fig_6

Fig_7

Fig_8

Fig_9

Fig_10

INVENTOR
JUNG Y. LOWE
BY
Harvey J. Lowhurst
ATTORNEY

INVENTOR.
JUNG Y. LOWE
ATTORNEY

Fig_25

Fig_26

Fig_27

Fig_28

INVENTOR.
JUNG Y. LOWE
BY
ATTORNEY

United States Patent Office 3,442,406
Patented May 6, 1969

3,442,406
MATERIAL CARRIER UNLOADING
MEANS AND METHOD
Jung Y. Lowe, San Francisco, Calif.
(3956 Koko Drive, Honolulu, Hawaii 96816)
Filed Apr. 18, 1967, Ser. No. 631,675
Int. Cl. A47f 9/02; B65g 67/48
U.S. Cl. 214—62                        31 Claims

ABSTRACT OF THE DISCLOSURE

A material carrier including a basket which is generally horizontal while carrying the material and which can be tilted by manipulation of the basket and the carrier frame to unload the basket contents. The basket is maintained in a stable tilted position by frictional engagement of the basket with the frame. An unloader is also provided which automatically positions the carrier at an unloading station and tilts the basket for unloading. The unloader then releases the unloaded carrier with the basket thereof in either the horizontal or tilted position.

BACKGROUND OF THE INVENTION

Field of the invention

This invention relates in general to material carriers, and relates more particularly to such carriers, and unloaders therefor, which can be manually or automatically unloaded.

Description of the prior art

In many industries and businesses there is a need for improved materials handling equipment and techniques. Basket type carriers are especially valuable to transport and position articles, materials and other objects, particularly when the carriers can be nested into one another during storage to occupy a minimum of floor space. Since storage area is relatively expensive in all commercial buildings, the nesting type wheeled-carrier with basket is often exclusively used as an integral and important part of the business system, such as in small parts inventory warehouses and in supermarkets.

Commercially available nesting carriers are usually constructed of rigid metal tubing and latticed welded strips of wire which comprise the basket portion. Such construction has many drawbacks, including the inability to hold liquids and very small objects, the non-smooth interior of a basket constructed out of crossed wires with open spaces, and the difficulty of emptying such baskets due to their rigid horizontal posture and generally box-like construction with high vertical walls. A nesting carrier so constructed to eliminate these objections would provide a new and valuable piece of equipment to many diverse industries because of the increased efficiency and versatility associated with its use.

For example, the food retailing industry is the largest retail business in this country in terms of sales, and the tens of thousands of supermarkets presently operating include thousands which sell over a million dollars worth of food and other items annually. In order to produce this volume of business, each of the several checkout stands in such a market may sell approximately $7500–$10,000 worth of merchandise each week. The cashier who handles such a checkout stand on a busy day may sell as much as $3000 worth of merchandise, which, according to published research, could require the exercise of over 7500 head and eye muscle movements, as well as the expenditure of a great deal of energy in hand and leg movements. As an example, it has been shown that a cashier who bends down to unload groceries from shopping carts may lift a total of two to three tons weight on a busy day.

Employee fatigue under these conditions is well known to the management of supermarkets, and they are also aware that it causes serious cumulative mistakes in ringing up prices on the cash register, thus costing the store substantial sums each year in addition to higher labor and time costs for unloading of the carts. Additionally, studies have shown that the greatest source of customer dissatisfaction with a supermarket is waiting to be checked out by the cashier, and there is at present a substantial need for new efficient methods and apparatus to carry and unload articles, which will also minimize this waiting time.

Summary of the invention

In accordance with the present invention, there is provided novel apparatus to support a load, transport it by carrier to an unloader, and discharge the load quickly and efficiently. This apparatus includes a carrier, which may be wheeled, with a basket pivotally secured to its superstructure, and cooperative unloader apparatus with an elevator ramp. The basket is tiltable from the generally horizontal load-carrying position for discharging the contents thereof. The basket co-acts with its associated superstructure in such a manner that the basket will remain in the tilted position in a stable condition, if desired, so that the carrier may be stored in a nesting posture with like carriers to collectively occupy a minimum of floor space. In addition, the superstructure of the carrier includes supporting members which can move closer together for nesting, thereby reducing a unit's floor space requirements.

When the carrier is utilized with the unloader of this invention, the loaded carrier is placed on the ramp of the unloader and the ramp is then elevated, causing the carrier superstructure to move and its configuration to change because the top of the basket is placed under a restraining force by members of the unloader. This causes the basket to tilt, controllably discharging its contents onto suitable apparatus which serves to temporarily hold all or part of the discharged contents before they are conveyed away. After the basket is emptied, the operator can select whether the carrier is released from the unloader with its basket in horizontal or tilted position.

It is therefore an object of this invention to provide a material carrier having a generally horizontally positioned basket which can be tilted to discharge the contents thereof and to permit efficient nested storage of the carrier when not in use.

It is another object of this invention to provide a material carrier having basket support pivot points located adjacent to the basket rim to permit deep nesting of the carriers and baskets, thereby conserving valuable storage area.

It is a further object of the present invention to provide a carrier having a load-supporting tiltable platform, and a superstructure supporting the platform including base members which draw closer together when the platform is tilted to reduce the floor area occupied by the carrier.

Another object of this invention is to provide a carrier with basket that can rest directly upon portions of the carrier support members when substantially horizontal, or tilted to an upright position to thereby maintain its posture for operational stability and simplicity in construciton.

It is an additional object of this invention to provide methods and apparatus for receiving and transporting articles, materials, liquids or other objects in a mobile carrier having a load-supporting basket or platform, the carrier being sturdy and of relatively simple lightweight construction and capable of being manipulated for unloading at a controlled rate of discharge.

A further object of this invention is to provide methods and apparatus for easily separating a carrier nested with others, and pivoting its basket rearward to the horizontal by moving its handles rearward and downward in a single motion.

It is a further object of the present invention to provide methods and apparatus for unloading carriers of the type set forth above, the unloader providing a controllable rate of discharge of the carrier's basket contents and having provision for releasing the carrier after unloading with the basket thereof in either the horizontal position or the tilted nesting position.

It is an additional object of this invention to provide unloading methods and apparatus for carriers of the type set forth above, in which a number of carriers can be consecutively and rapidly unloaded efficiently with a minimum of human effort, and the unloaded carriers can be quickly and easily manipulated for reloading or compact storage utilizing a minimum of floor space.

Objects and advantages other than those set forth above will be apparent from the following description when read in connection with the accompanying drawings, in which:

DESCRIPTION OF THE PREFERRED EMBBODIMENT

Carrier structure

Figure 1:
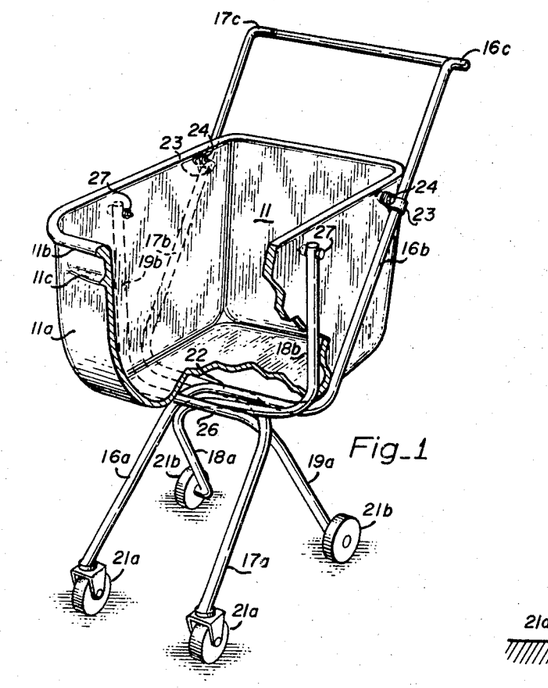
FIG. 1 is a perspective view of a preferred type of wheeled carrier and basket in accordance with this invention, with certain parts broken away.
Figure 2:
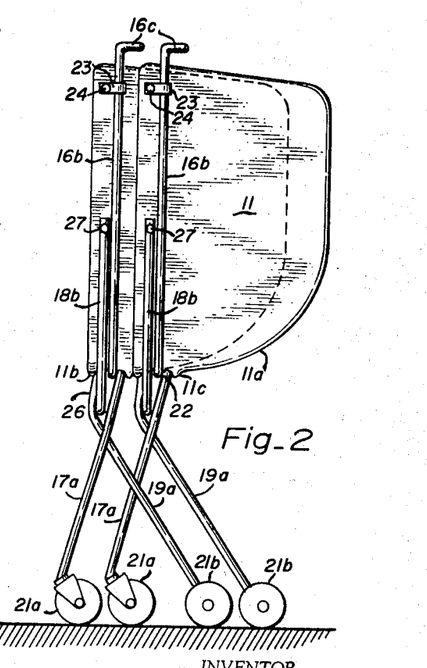
FIG. 2 illustrates a pair of the wheeled carriers of FIG. 1 with baskets arranged in nested relation.

One embodiment of the wheeled carrier of this invention is illustrated in FIGS. 1 and 2. Generally, the carrier comprises a basket 11 which is supported on a base. Basket 11 is preferably formed from a suitable lightweight rigid, solid material of substantial strength, such as aluminum or other suitable metal, plastic, resin-treated fiberglass, or plywood. As an alternate to such solid construction, however, basket 11 may be formed of wire or shaped strips, or comprise a combination of rigid material for portion of front wall, basket rim including pivot adjuncts, and flexible material for the load carrying basket portion which is suspended below.

Basket 11 has a front wall 11a which is arcuately contoured to facilitate the gravitational flow of objects, materials or liquids down this front wall when the basket is tilted for discharge of the contents thereof. The contoured front wall also permits the basket to pivot clear of carrier frame, as will be described in detail below. The basket sides and rear walls are tapered inward toward the bottom wall to permit nesting with like baskets.

The basket is also provided with a reinforced lip 11b on at least the front wall thereof to provide desirable rigidity along this wall and to act as a stop to prevent the basket from tilting past the vertical. Front wall 11a is also preferably provided with a raised transverse rib 11c which is spaced from and generally parallel with lip 11b. The space between rib 11c and lip 11b engages a portion of the frame when the basket is in the vertical position, in a manner to be described below, to firmly hold the basket in the vertical position.

The carrier frame for supporting basket 11 comprises a pair of front base members 16a and 17a, and a pair of rear base members 18a and 19a. The front and rear base members are preferably formed of a lightweight metal tubular material. The lower ends of these front and rear base members may preferably receive casters and wheels 21a, 21b, respectively. Front base members 16a, 17a are in generally parallel spaced relation and are inclined upward toward the center of basket 11. Rear base members 18a, 19a converge at their upper parts and are farther apart than front base members 16a, 17a, to permit the front base members of another carrier to enter therebetween and nest closely, as shown in FIG. 2.

Front base members 16a, 17a are bent inwardly underneath basket 11 and cross each other to form a junction 22 which is secured together by welding or the like. The members then continue upwardly and rearwardly from junction 22 to form rear basket support members 16b, 17b. Rear support members 16b, 17b pass freely through collars 23 which are pivotally secured to opposite sides at the rear of basket 11. Collars 23 are preferably formed of flat stock bent into a loop with flattened end portions which are provided with openings to receive a pivot pin 24, such as a rivet, which is secured to basket 11.

Members 16b, 17b continue upwardly and rearwardly above basket 11 and are provided at their upper ends with handle portions 16c, 17c which are joined together to form a handle for pushing and steering the carrier.

Rear base members 18a, 19a similarly are bent inwardly underneath basket 11 to form a junction 26 which may be formed by welding or the like. These members continue upwardly from junction 26 to form central basket support members 18b, 19b. The upper ends of central basket support members 18b, 19b are provided with openings which receive pivot pins 27, such as rivets, which are secured to the walls of basket 11. Spacer washers may be provided on pivot pins 27 between support members 18b, 19b and the walls of basket 11, as well as on pivot pins 24 between rear basket support members 16b, 17b and the basket walls.

When basket 11 is in the horizontal position shown in FIG. 1, its bottom rests on junction 22 which is located approximately midway between the front and rear basket walls. Front base members 16a, 17a, which are connected to junction 22, fit in close sliding relation astride the adjacent junction 26 and are restrained from moving downward out of place by the converging portions of members 18a, 19a which meet to form junction 26. The upper shoulders of members 18a, 19a, and the lower shoulders of members 18b, 19b are spaced wider apart than members 16a, 17a, and this prevents members 16a, 17a from moving either laterally or upwardly out of place when junction 22 pivots about junction 26, despite the increasing separation between these junctions as members 16b, 17b move forward into parallel alignment with members 18b, 19b as basket 11 tilts forward toward the nesting position, which will be described more in detail below.

This above-described sturdy interlocking pivotal arrangement provides longitudinal flexibility for the cooperating junctions 22, 26 which is essential so that basket 11 can be tilted to a vertical position and held in place by junction 22 moving upward until it makes frictional contact with the portion of front wall 11a between lip 11b and rib 11c.

*Carrier operation*

Figures 3A, 3B, 3C:
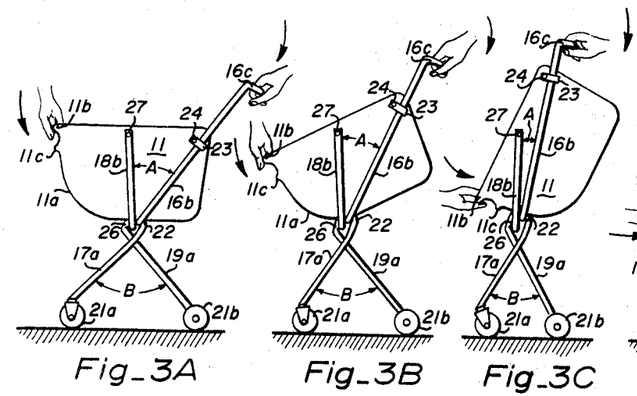
FIGS. 3A–3D are a sequential series of side views of the carrier as it moves from the position with its basket horizontal to the position with its basket vertical.

This action is most clearly shown in FIGS. 3A–3D which illustrate the motions involved as the basket moves from the horizontal position to the nesting position. In FIG. 3A, basket 11 is in the horizontal position and a downward force is applied to the front of the basket in the area of lip 11b while a restraining force is applied to the carrier handle to prevent undesired movement of the carrier. In FIG. 3B, basket 11 has started to tilt under the action of the force on lip 11b, and collars 23 and the rear of the basket have moved upwardly on basket support members 16b, 17b. This movement of collars 23 and the rear of the basket also has caused members 16b, 17b and front base members 16a, 17a to pivot about junction 22 relative to members 18 and 19. This movement is shown by the decrease from FIG. 3A to FIG. 3B in the angle A between members 16b and 18b, and the decrease in the angle B between members 17a and 19a.

In FIG. 3C, force continues to be applied to lip 11b to tilt the basket, and angles A and B continue to decrease as members 16b, 17b approach a vertical position. The function of the arcuately contoured front wall 11a to facilitate the basket 11 clearing junctions 22 and 26 as the basket tilts is clearly seen in FIGS. 3B and 3C. As the basket is moved through the positions shown in FIGS. 3B and 3C, the contents thereof will begin to be discharged over lip 11b.

Figure 3D:
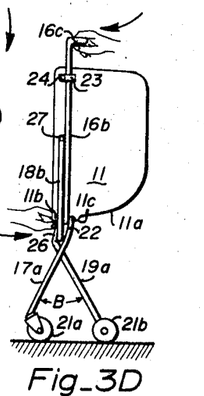

Shortly after the basket rotates past the position shown in FIG. 3C, rib 11c encounters junction 22 and is forced over this junction so the junction is positioned between rib 11c and lip 11b. In this position, as shown in FIG. 3D, basket 11 is vertical and rests its weight on junction 22. It will be seen from FIG. 3D that junction 22 has moved upwardly from its original position in FIG. 3A until it is nearly directly above junction 26. The weight of basket 11 thus acts in nearly a straight line downwardly through pivot pins 27 and junction 22 and is supported by these elements. The basket is very stable in this position by virtue of the gripping action provided on junction 22 between lip 11b and rib 11c. Similarly, the entire carrier assembly is stable against overturning because of the weight of the basket acting nearly straight downwardly in a line which is approximately midway between the front and rear wheels in FIG. 3D.

After the contents of basket 11 have been removed, either by hand or by gravitational forces as the basket is tilted or by a combination of these forces, the carrier may be moved to a position for storage where it may be nested with other carriers. As described above, the front wheels and front base members 16a, 17a of one cart will fit between the rear wheels and rear base members 18a, 19a of a carrier in front of it. Thus, as shown most clearly in FIG. 2, the carriers may be nested with one basket into another and with front and rear wheels nested. This results in a minimum requirement of storage space for the carriers when not in use.

To separate a carrier for use, the operator may withdraw the most rearward nested carrier simply by pulling back on handles 16c, 17c, and it easily separates from the preceding carrier because of minimum friction. Continued pulling on the handles draws the carrier clear and by abruptly forcing the handle down and rearward in an arcing direction, the basket 11 is lifted up from junction 22 and, due to the rearward force applied to pivots 24, pivots rearward down to the horizontal. Bottom wall of basket 11 settles to rest on top junction 22 for optimum platform stability, and front base members 16a, 17a move away from rear base members 18a, 19a to increase carrier stability.

*Unloader structure*

Figure 4:
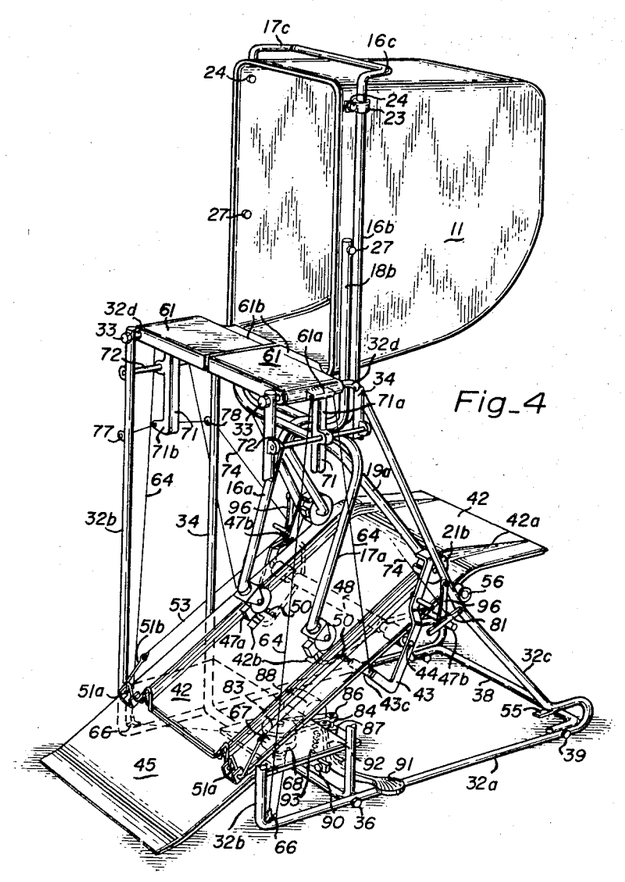
FIG. 4 is a perspective view of unloader apparatus in accordance with this invention, showing the ramp elevated and the carrier thereon with its basket in the vertical position.

From the above description, it will be seen that the carrier of this invention is useful by itself to provide a device which can be easily unloaded by tilting as described above and which can be nested together with other carriers in a minimum of space when not in use. The carrier of this invention is also useful in conjunction with essentially fully automatic means for unloading it and for controlling its release from the loading station to place the basket in either the horizontal position or the tilted position. Referring to FIG. 4, one embodiment of such means is illustrated. The unloader includes a frame comprising base members 32a, vertical members 32b, and inclined members 32c which guide the ascent and descent of the ramp carrying the carrier. All of these frame members are preferably formed from continuous sturdy and lightweight tubular sections bent to the desired shape to form the generally triangular configuration shown. Inclined members 32c may have horizontal members 32d at the upper ends thereof which receive bolts 33 passing through openings in the upper ends of vertical members 32b to form a rigid assembly.

The frame members are maintained in vertical shapes and in the desired spaced relation by a transverse U-shaped support member 34 having its upper ends secured to the frame members at the rear of upper horizontal members 32d. The base of support member 34 is secured to frame base members 32a by bolts 36.

The frame members are maintained mutually abreast and in parallel spaced relation along their lengths by a rear support member 38 having its end portions bent forward and secured to the rear of base members 32a by bolts 39. This use of bolts and matching threaded openings with the frame members and supports permits rapid dismantling of the unit into sub-assemblies for compact shipment and rapid assembly at the site of operation.

Figure 5:
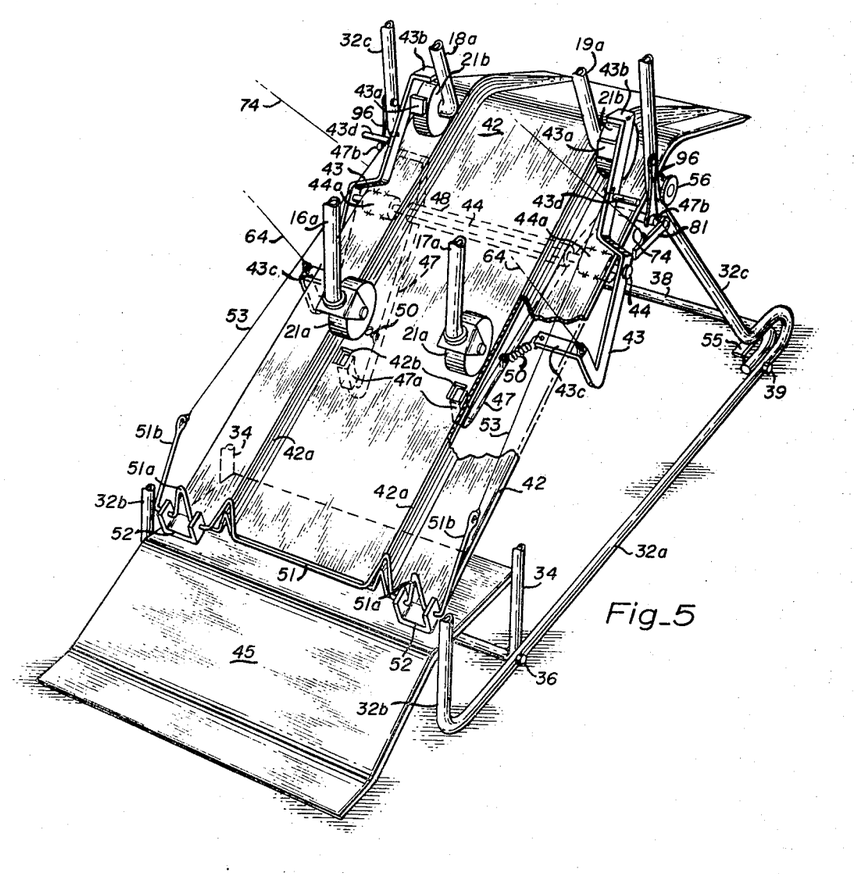
FIG. 5 is a perspective view, on an enlarged scale, of the ramp portion of the unloader of FIG. 4, showing the carrier wheel clamp and stop assemblies and associated mechanisms.

The unloader includes a movable ramp 42 made of a suitable rigid material and having raised reinforcing ribs 42a running at least a portion of the length thereof. A stationary ramp 45 is positioned under the forward end of ramp 42, and the front end of ramp 42 slides on ramp 45 during its ascent and descent. Ramp 42 has mounted thereon rear wheel clamp assemblies 43 which serve to engage and control rear wheels 21b of a carrier. As best shown in FIG. 5, wheel clamp assemblies 43 are in the form of a lever arm having transverse clamp members 43a, 43b at the rear thereof which engage and stop the rear wheels 21b of a carrier. Wheel clamp assamblies 43 are fixedly secured to transverse shaft 44 which is journalled for rotation in suitable bearings 44a housed on the underside of ramp 42. Members 43 also include transverse fingers 43c on their forward ends, as well as transverse studs 43d to the rear of pivot shaft 44.

Still referring to FIG. 5, the ramp also inludes front wheel stop members 47 which are preferably formed from tubular sections and which have forward end portions 47a extending vertically. Foward end portions 47a are adapted to rise through openings 42b in ramp 42 to engage the front casters 21a of the carrier, in a manner to be described more in detail below. Front wheel stop members 47 extend rearwardly from vertical portions 47a and are affixed to a rotatable tubular bearing shaft 48 which is concetric with and fits around shaft 44 so that members 47 rotate about the same axis as shaft 44 and rear wheel clamp assemblies 43. Front wheel stop assemblies 47 continue rearwardly from shaft 48 in a diverging relation and terminate in rearmost sections 47b which are turned outward in transverse relation. Tension springs 50 are connected between the forward portions of arms 47 and transverse fingers 43c on rear wheel stop assemblies 43. Forwardly protruding tabs 55 are provided on the lower portion of frame members 32c to ensure full retraction of stops 47a through openings 42b when the ramp decends to the limit, as will be described below.

Ramp 42 also includes a ramp release trigger mechanism at the forward edge thereof. This mechanism includes trigger shaft 51 which is bent from a section of rigid rod material to provide a pair of inverted V-shaped portions 51a located so as to engage rear wheels 21b as the carrier rolls down the ramp after unloading. Trigger shaft 51 is pivotally supported on ramp 42 by brackets 52 having aligned openings to hold rod 51 which rotates therein when rear wheels 21b roll forward over erect portions 51a, pressing them down in passing. The ends of shaft 51 are bent externally of brackets 52 to form tirgger arms 51b which are provided with eyelets at the end thereof to rereceive trigger cables 53. Cables 53 extend rearwardly and are secured to rear wheel clamp assemblies 43 adjacent transverse studs 43d.

Ramp 42 is provided with concave outboard rollers 56 which rest on and roll along inclined side members 32c of the carrier frame to guide ramp 42 in its ascent and descent. Rollers 56 are rotatably mounted on a shaft (not shown) which is secured to the underside of ramp 42.

Referring again to FIG. 4, the unloader also includes pivot wing members which are movable to form a horizontal shelf for supporting the contents of the carrier as they are discharged therefrom, and which pivot out of this horizontal position to permit the released unloaded carrier to pass forward. These pivot wings may be as shown at 61 in which FIG. 4, where they have assumed a horizontal position with basket 11 at the vertical position in the unloading operation. Wings 61 are preferably made from a thickness of light rigid material of sufficient strength to support the contents of the carrier. Wings 61 are pivotally supported on upper horizontal members 32d of the unloader frame, members 32d passing through openings in the ends of the wings to provide the pivotal suppport. Wings 61 have thin ledges 61b projecting rearward from the upper portion of the wing edges to facilitate proper engagement with the basket lip 11b. Wings 61 will gravitationally move downward about their pivots to a vertical position, and are movable from this position to the horizontal position shown in FIG. 4 where their inner edges almost meet. Wings 1 are also movable upwardly from the position shown in FIG. 4 to a vertical position, as will be described below.

Wings 61 have extensions 61a on their outboard edges which have openings therein to act as cable guides for cables 64 which control the movement of the wings. Cables 64 have their forward ends passing around corner guides 66 at the lower front corners of the unloader frames, and they pass to cable reels 67, 68 where each cable end is secured to a separate reel. The rearward ends of cables 64 are secured to the forward ends 43c of wheel clamp assemblies 43.

The movement of wings 61 is controlled during some phases of the unloader operation by vertical stop levers 71 which are journalled for rotation on shafts 72 extending horizontally between vertical frame members 32b and support member 34. Levers 71 have upper portions 71a, the ends of which bear against the bottoms of extensions 61a of wings 61 when the levers are in the position shown in FIG. 4. In this position, levers 71 act as stops to prevent cables 64 from moving wings 61 upwardly past the horizontal position shown.

Figure 12:
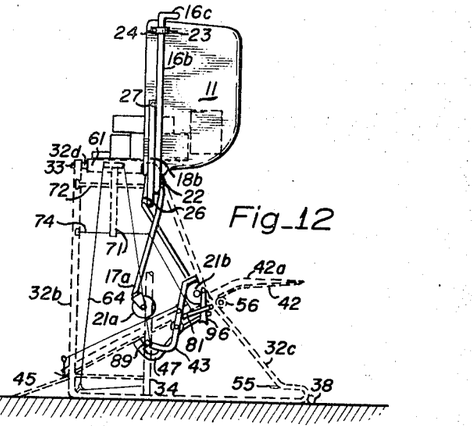
Figure 12A:
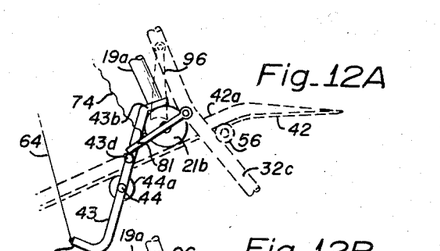
FIGS. 12A–12C illustrate the action of the trigger arms during the rise of the ramp.
Figure 12B:
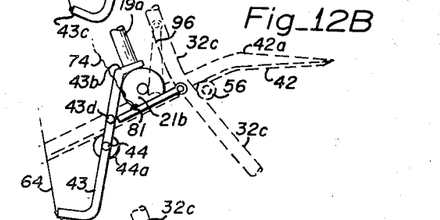
Figure 12C:
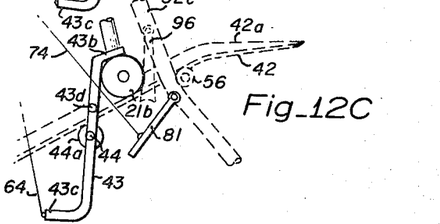
Figure 13:
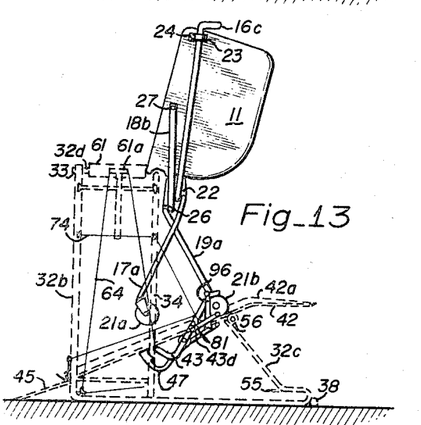

Levers 71 are also provided with lower portions 71b extending outwardly and provided with eyelets through which cables 74 pass. Cables 74 are secured at their forward ends to vertical frame members 32b through anchors 77. After pasing rearward through the eyelets in lever portions 71b, cables 74 pass through cable guides 78 on support members 34 and have their rearward ends secured to wing trigger arms 81. As best shown in FIGS. 12A–12C, trigger arms 81 are pivotally secured to inclined frame portions 32c. Trigger arms 81 when pressed can pivot downwardly, thus pulling cables 74 taut and straightening these cables between anchors 77 and guides 78. Referring again to FIG. 4, this straightening of cables 74 under tension forces the lower ends 71b of levers 71 inwardly about the pivot on shaft 72, since cables 74 pass through the eyelets in lower lever portions 71b. This pivoting of levers 71 causes the upper ends 71a thereof to swing outwardly to clear extensions 61a of wings 61. This frees wings 61 to swing outwardly from the horizontal position shown in FIG. 4 by action of cables 64, as will be described more in detail below.

Motive power for operating the unloader is supplied through cable reels 67, 68 and their associated driving means. As indicated above, the forward ends of each of cables 64 is connected to one of reels 67, 68. Reels 67, 68 are mounted on a vertical shaft which is journalled in bearings supported on transverse frame support member 34. To this shaft is fixedly attached driven pulley 83 at the top thereof, and pulley 83 is coupled through a drive belt 84 to a driver pulley 86. Driver pulley 86 is mounted on a vertical shaft which is connected to a speed reducer assembly 87 driven by a variable speed electric motor 88. The operator may regulate the speed of motor 88 by means of a conventional electric motor speed control (not shown).

A limit switch 89 (FIGS. 12 and 21) is mounted on support member 34 in a position to be engaged by the forward end 43c of one lever arm 43 when ramp 42 reaches the apex of its ascent. Opening of limit switch 89 opens the power circuit to motor 88 to stop the motor and ramp 42 in a stable position. Using the speed control, the operator may stop motor 88 at any point during the ramp ascent to hold the ramp at that point. Ramp 42 is maintained at any such position due to the braking effect of speed reducer assembly 87. A foot pedal 91 is provided to control the descent of ramp 42. This foot pedal is part of a lever pivoted on a shaft 90 and having an arm 92 with idler pulley at its end in horizontal rotation posture, normally bearing against belt 84 under the action of tension from spring 93. Depression of foot pedal 91 counteracts the spring to pivot arm 92 and idler pulley away from belt 84 which slackens, thus effectively disengaging pulley 83 from pulley 86 and allowing pulley 83 to freely rotate due to the pulling action of cables 64 unwinding from reels 67, 68 as ramp 42 descends under the force of gravity.

Unload selector arms 96 are pivotally supported on inclined frame members 32c. Selector arms 96 have an inverted V-shaped notch at their lower ends which may engage the transverse end portions 47b of the front wheel stop members 47 on both sides of the unloader. Arms 96 are simultaneously actuated by any simple arrangement, such as control cables running from each arm to a central lever (not shown) which will be obvious to those skilled in this art. The arms may be swung rearwardly to engage end portions 47b as they ascend with ramp 42. This prevents portions 47b from ascending further, although ramp 42 continues its ascent until limit switch 89 is opened. Engagement of portion 47b within the notch in selector arms 96 will cause members 47 and bearing shaft 48, to which they are secured, to pivot about transverse shaft 44 so that front wheel stops 47a rise through openings 42b in the ramp floor to protrude above the floor of ramp 42 and engage front casters 21a, as shown in FIG. 4.

*Operation of the unloader*

Figure 6:
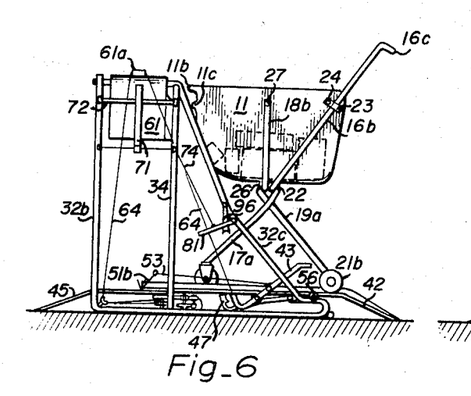
FIGS. 6–19 are a sequential series of side views of the unloader and carrier, progressing from arrival of the carrier on the unloader ramp, its elevation to the unloading position, its release from the unloader with its basket in the horizontal position, and return of unloader ramp and wings to the starting positions.
Figure 7:
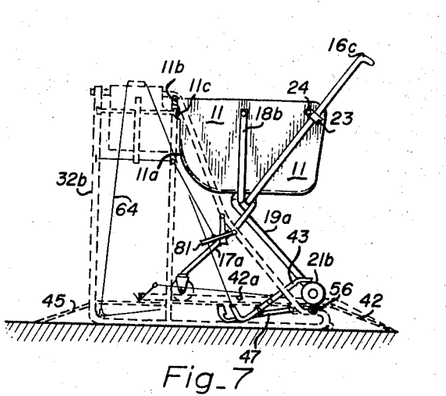

The operation of the unloader for a representative unloading operation is illustrated in FIGS. 6–19, where it is assumed that the carrier is to be released with basket in the horizontal position after unloading. In FIG. 6, the carrier has been driven forward onto the rear portion of ramp 42 and rear wheels 21b are about to roll under stop portions 43a, 43b of the wheel clamp assemblies 43. The carrier may be manually driven onto the ramp or may be placed thereon by means of a mechanical conveyer, in accordance with principles well known in the art. In FIG. 7, rear wheels 21b have just partially come under portions 43b, and the unloading operation may soon begin. In connection with FIGS. 6–24, it will be understood that it is not possible to show all of the details of the unloader structure in these figures, and that reference should be had to FIGS. 4, 5 and 12A–12C for such details.

Figure 8:
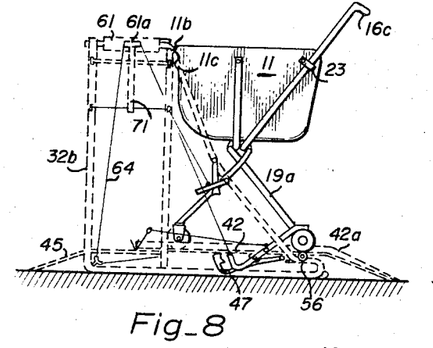
Figure 9:
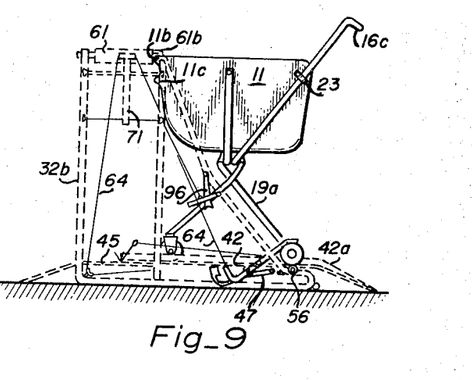

After the carrier is pushed forward so rear wheels 21b press against wheel clamp stops 43a, as in FIG. 8, the unload operation may begin by the operator who controls the switch regulating the speed of motor 88, which is coupled to cable reels 67, 68 through speed reducer 87, pulleys 83 and 86 and connecting belt 84. As cable reels 67, 68 rotate, they wind in cables 64 increasing tension therein which pull wing extensions 61a downwardly and cause wings 61 to pivot upwardly from their downward vertical resting position to the horizontal position shown in FIG. 8. The upward movement of wings 61 is halted at the horizontal position by the upper ends 71a of stop levers 71 engaging the bottoms of wing extensions 61a. In the horizontal position, wing ledges 61b are forward clear of and slightly above the lip 11b of basket 11, as shown in FIG. 8. This permits basket 11 to be moved forward and slightly upward to press lip 11b under ledges 61b and against the rear edges of wings 61, as shown in FIG. 9. This motion of basket 11 is produced by cables 64 pulling ramp 42 forward to move rollers 56 along the lower segments of inclined frame portions 32c, which have only a slight inclination.

Further reeling in of cables 64, which are attached to the forward ends of levers 43, pulls ramp 42 forward and also pivotally forces wheel stop portions 43a, 43b to press down on rear wheels 21b. Although the rear wheels are held firmly in place by this action of members 43a, 43b, the carrier superstructure is free to pivot about the wheels and change configuration as the ramp rises. It will be seen that a heavy load in basket 11 results in greater locking pressure against the rear wheels, since it requires increased cable tension to lift the ramp with a heavy load, with a corresponding increase in leverage applied to the wheel clamps.

Figure 10:
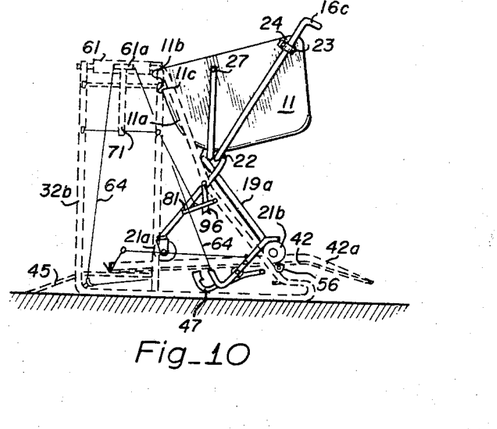

Referring to FIG. 10, as cables 64 continue to pull ramp 42 forward, its outward rollers 56 travel up on inclined frame members 32c causing ramp 42 to rise further and pushing basket lip 11b firmly under ledges 61b. The upward force against rear wheels 21b is transmitted through rear base members 18a, 19a and basket supports 18b, 19b to pivots 27, thus forcing basket 11 to tilt forward, as shown in FIG. 10, because lip 11b is restrained in place. The inclined frame portions 32c are precisely positioned so that the basket mouth will be in the desired vertical plane when ramp 42 reaches the apex of its rise, and basket support members 16b, 17b and 18b, 19b will be properly aligned as illustrated in FIG. 12.

Figure 11:
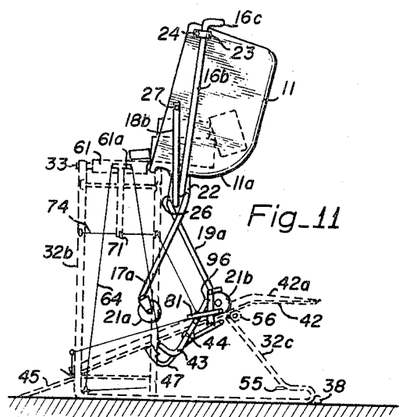

As basket 11 tilts forward, its contents slide down the front arcuate wall 11a under the force of gravity and out over lip 11b and onto ledges 6b and wings 6, as shown in FIG. 11. The discharge rate will be commensurate with the rate of tilting, and, if desired, the operator can shake out objects by applying motor power alternately on and off to impart a jerking motion to the basket. Excessively bulky objects and items not suited for sliding may be conveniently taken out from the basket by manual or other means.

During the unloading, wings 61 remain horizontal depite the weight of the unloaded objects because of the downward tension on extensions 61a by cables 64 passing therethrough and the force from basket lip 11b pressing up against ledges 61b. Wings 61 are intended for use as staging platforms where materials can be inspected and held momentarily before being pushed off onto an adjacent ramp or the like.

As ramp 42 continues to rise, basket 11 continues to tilt forward and collars 23 continue to slide up along members 16b, 17b which also move downward as junction 22 pivots about junction 26, in a manner similar to that described above for the manual operation of the carrier. However, during manual unloading, junction 22 remains close against basket wall 11a, as illustrated in FIGS. 3A–3D, whereas use of the unloader device causes junction 22 to gravitationally descend away from basket wall 11a as best illustrated in FIGS. 10–12. This action permits casters 21a to be positioned closely above ramp 42 when basket 11 is vertical, as in FIG. 2, so that front wheel stops 47a can rise to make contact with the casters as will be explained below. During this movement of the ramp 42, its front end slides forward on top of the stationary ramp 45 underneath.

When the rear end of ramp 42 approaches the apex of its ascent, transverse studs 43d of the wheel clamp assemblies 43 come into contact with the underside of trigger arms 81. This action is best illustrated in FIGS. 12A–12C, where FIG. 12A shows the contact of studs 43d with arms 81, and arms 81 being pivoted upwardly thereby as ramp 42 is ascending. In FIG. 12B, ramp 42 has continued upwardly and studs 43d have just slipped past the end of trigger arm 81. When studs 43d slip past arms 81, the arms drop downwardly until checked by taut cables 74 which position the arms, as shown in FIG. 12C.

When the ramp reaches the apex of its travel, as shown in FIG. 12, power to motor 88 is interrupted by the opening of limit switch 89. The ramp remains in the elevated position because speed reducing assembly 87 acts as a braking mechanism against the pull of cables 64, thus preventing ramp 42 from descending. This condition also prevails any time the motor is shut off during any part of the ramp ascent.

*Carrier release with basket horizontal*

Figure 14:
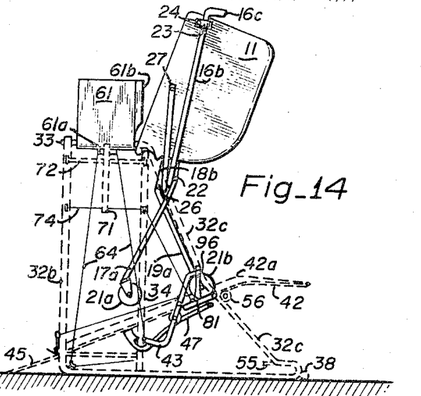
Figure 15:
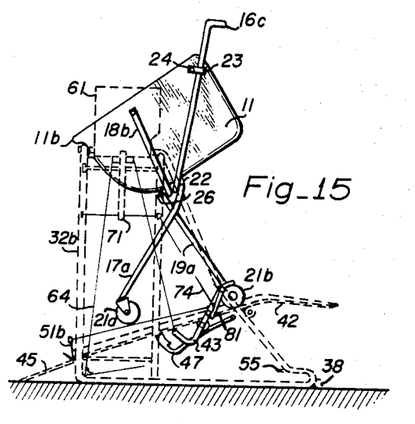

To release the unloaded carrier from the ramp with basket 11 in the horizontal position, the operator depresses foot pedal 91 to effectively disengage the cable reels 67, 68 from the speed reducer 87, as described above. This permits cables 64 to unwind from reels 67, 68 under the weight of the ramp and the carrier. When ramp 42 descends, as in FIG. 13, studs 43d of wheel clamp assemblies 43 contact the upper side of trigger arms 81 and press down on these arms to tighten cables 74. This forcibly straightens each cable 74 between anchor points 77 and guides 78 (FIG. 4) to thus move the lower ends 71b of levers 71 inwardly. Thereby the upper ends 71a of levers 71 pivot outwardly and clear of extensions 16a on wings 61, freeing wings 61 to pivot upwardly from their horizontal position. Referring to FIG. 14, wings 61 rapidly move to an upward vertical position because of the downward tension from cables 64 acting upon cable guide openings through extensions 61a. At this time, the mouth of basket 11 is tilted back from the vertical so ledges 61b may quickly pivot upwardly clear of basket lip 11b and outward of the basket sides before gravity overcomes the positional inertia of the carrier and basket which thereafter drops forward and down onto ramp 42 as shown in sequence FIGS. 14–16.

Cables 74 are under tension at this time and hold trigger arms 81 in a fixed position so that wheel clamp assemblies 43 must rotate to a generally vertical position about shaft 44 by virtue of studs 43d bearing against the upper side of trigger arms 81 as ramp 42 descends because cables 64 continue to unwind. This action can be readily visualized by reference to FIGS. 12A–12C where it can be visualized, particularly from FIG. 12C, that studs 43d will strike the front portion of arms 81 during the ramp descent and will cause wheel clamp assemblies 43 to pivot toward the vertical about shaft 44.

Figure 16:
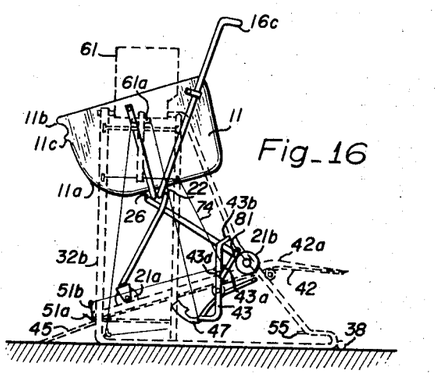
Figure 17:
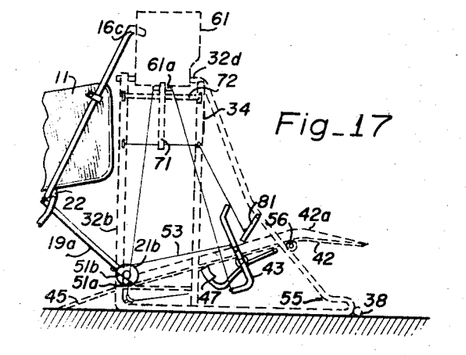

As wheel clamp assemblies 43 pivot toward the vertical, clamp members 43a, 43b rise above rear wheels 21b, as shown in FIG. 16, allowing wheels 21b and carrier to roll freely down ramp 42, with the casters 21a and wheels 21b being guided by ramp raised floor ribs 42a. As the carrier rolls down the ramp, its rear wheels 21b strike and roll over wheel triggers 51a which pivot forward, causing arms 51b to move forward in an arc. Cables 53 are connected to eyelets at the tips of arms 51b, to wheel clamp assemblies 43 adjacent transverse studs 43d, and this pivoting of arms 51b abruptly rotates the upper portions of assemblies 43 forward so that studs 43d are pulled clear off the forward ends of trigger arms 81, as shown in FIG. 17. This permits ramp 42 to descend freely until restrained by the light braking action of cables 64 which become taut as the transverse fingers 43c of wheel clamp assemblies 43 pivot up against the underside of ramp 42, as in FIG. 18.

Figure 18:
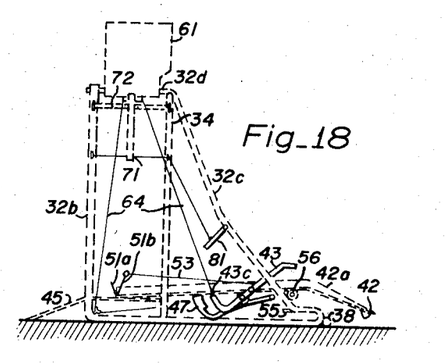
Figure 19:
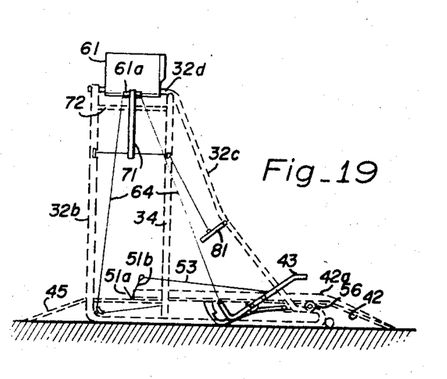

Ramp 42 continues to descend slowly as cables 64 unwind with frictional braking action due in part to the loose belt 84 to permit the carrier to roll off before the ramp 42 comes to rest, as shown in FIG. 18. When ramp 42 reaches the horizontal position, as shown in FIG. 19, wheel clamp assemblies 43 are positioned by fingers 43c so that transverse clamp members 43a, 43b thereof are properly positioned above ramp 42 to receive the next carrier's rear wheels 21b, for unloading. Wings 61 pivot inwardly as cables 64 slacken due to rotational inertia of cable reels 67, 68 at the end of the ramp descent and wings 61 return to their downward vertical position of rest between frame members 32b and support members 34. The operator may then release foot pedal 91 to re-engage belt 84 connecting cable reel pulley 83 with driving pulley 86, and turn on the motor control switch to start the next unloading cycle.

*Carrier release with basket vertical*

Figure 20:
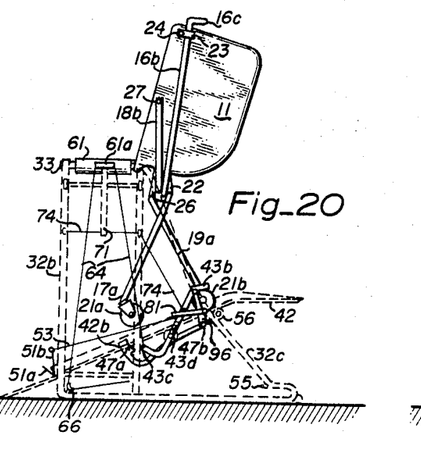
FIGS. 20–24 are a sequential series of side views of the carrier and unloader, commencing with the carrier basket approaching the vertical position, and illustrating the release of the carrier from the unloader with its basket in the vertical nesting position.
Figure 21:
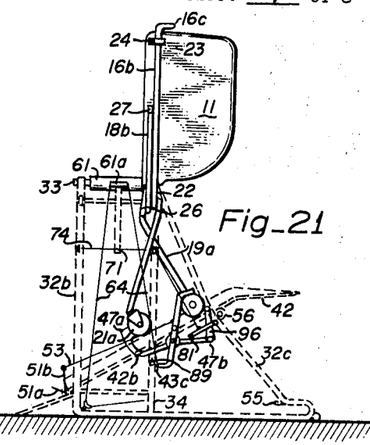
Figure 22:
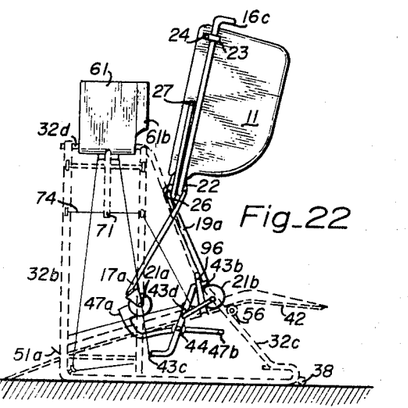
Figure 23:
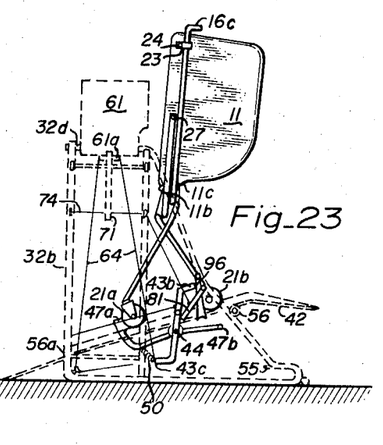

To release the unloaded carrier from ramp 42 with its basket in the vertical nesting position, the operator controls selector arms 96 at the start of the ramp ascent by moving the arms away from their normal vertically down position to the inclined position rearward so that its inverted V-shaped notch will engage the transverse sections 47b of front wheel stop members 47 as the ramp ascends. Except for this operation and its consequent effects, the ascent of the ramp and carrier is identical to that described above. Referring to FIG. 20, as the ramp continues to rise after selector arms 96 engage transverse sections 47b, stop members 47 secured to bearing shaft 48 pivot about shaft 44 causing forward end portions 47a to rise through openings 42b in the ramp. Forward end portions 47a move up to their fully extended position, as shown in FIGS. 4 and 21, and clamp against the front of front casters 21a of the carrier, restraining them in place. Carrier front base members 16a, 17a are thus prevented from moving forward relative to rear base members 18a, 19a, which pivotally forces basket support members 16b, 17b to remain generally parallel with members 18b, 19b and basket 11 in nesting position.

The operator controls the ramp descent in a manner similar to that described above, and as ramp 42 lowers, the vertically poised basket 11 withdraws rearwardly and downwardly away from wing ledges 61b. Wings 61 subsequently pivot upwardly, as described above and shown in FIG. 22, while forward end portions 47a and clamp members 43a, 43b maintain casters 21a and wheels 21b, respectively, immobile.

Figure 24:
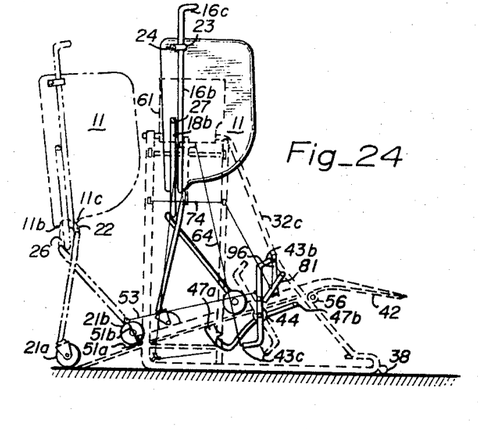

Forward end portions 47a retract underneath ramp 42 when the rear wheel clamp assemblies 43 pivot forward toward the vertical, as described above. This action is produced by tension springs 50 having ends which are attached to fingers 43c of wheel clamp assemblies 43, and to stop members 47 forward of bearing shaft 48. As wheel clamp assemblies 43 rotate, toward the vertical shown in FIG. 23, springs 50 are pulled downwardly and, being connected to stop members 47, cause forward end portions 47a to retract through openings 42b in ramp 42. This rapid retraction of the forward end portions 47a brings casters 21a to rest atop ramp 42 with freedom to move slightly forward as basket 11 still in vertical position gravitationally moves forward and downward, due to pivots 27 and supports 18b, 19b and 18a, 19a, pivoting about the axles of wheels 21b, until basket wall 11a comes to rest upon junction 22, and is frictionally held in place between lip 11b and rib 11c. The carrier and basket are now in nesting posture as shown in FIGS. 2 and 24.

As end portions 47a begin retraction, clamp members 43a, 43b start to rise off of rear wheels 21b, but the wheels are not free to roll down ramp until end portions 47a are fully retracted below surface of ramp 42 when clamp members 43a will have risen sufficiently to allow wheels 21b to roll underneath, as in FIG. 24. The rear wheels roll forward to activate wheel triggers 51a as described above. As the ramp settles into the horizontal position, transverse sections 47b contact tabs 55 which positively force forward end portions 47a to pivot and remain just below the level of the ramp floor.

From the above description, it will be seen that the unloader of the present invention is operative to essentially fully automatically elevate a carrier of this invention to an unloaded position so that the contents thereof are discharged, and then release the carrier with the basket in either a generally horizontal load-carrying position or a tilted nesting position as desired. There are many possible variations in the arrangement of a system utilizing the invention to accomplish practical purposes at better efficiency and lower cost than heretofore available. For example, in a self-service supermarket, the nested carrier may be stored conveniently near the entrances for the customers' use in transporting goods selected from shelves to unloaders at cashier checkout counters. At public transportation terminals, such as railroad stations and airports, the carriers may be dispersed throughout the terminal and adjacent parking lots for purposes of carrying luggage and freight to unloaders located at check-in counters and cargo stations.

Additionally, materials and articles may be efficiently transported between floors of a multi-story structure using carriers moving on suitable conveyor mechanisms, with unloaders located on the several floors and storage of carriers accomplished by using conveyor wells to hold unused carriers nested compactly. It can also be seen that the collection, transportation and unloading of such items as liquids, inventory stock, or dangerous materials can be more efficiently and easily accomplished using a form of the cart and unloader of the present invention with suitable remote controls.

Figure 25:
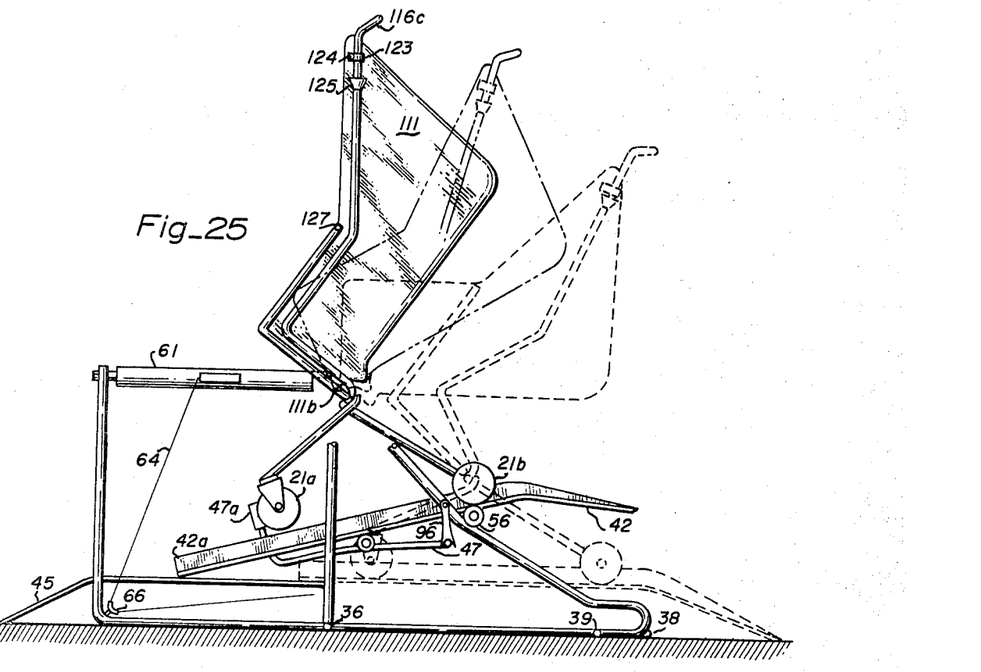
FIG. 25 is a side view of a modified carrier and unloader adapted for use with bulky objects which may overhang the front and side walls of the carrier basket.

These merely illustrate some possible uses and are not intended to define the limits of applicability for the invention since many variations of the carrier and unloader illustrated and described are possible and will occur to those skilled in the art. For example, FIG. 25 illustrates a carrier having a modified basket 111 which is especially adapted for holding and transporting relatively large and bulky objects which overhang the basket front lip 11b located at the forward edge of the bottom wall of the basket. The objects can more easily overhang the basket side walls by lowering the basket central pivot points 127 relative to the rear pivot points 124. Since the modified basket 111 in horizontal load carrying position does not rest upon base member junction under its bottom wall, the necessary support, in addition to central pivots 127, is provided by fixed stops 125 on the rear basket support members which prevent sliding collar 123, pivotally secured to basket at points 124, from descending further, thus maintaining the basket floor generally level. Basket 111 can be utilized alone or in conjunction with an unloader which is modified by shortening the relative height of the frame members so that the wings 61 engage lip 111b on the bottom wall of the basket. The modified unloader operates in a manner similar to that described above to unload the carrier and release it from the unloading station with the basket in either the horizontal or vertical position.

Figures 26, 27, 28:
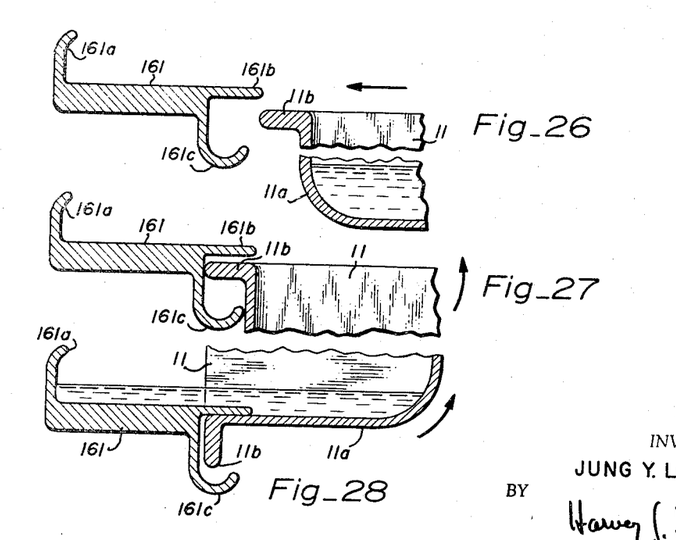
FIGS. 26–28 are a series of views illustrating the action of modified unloading wings for use with a basket containing a liquid.

FIGS. 26, 27 and 28 illustrate structure which may be utilized to unload basket 11 when it is carrying a liquid. The unloader includes wing members 161 which have a raised forward wall 161a on the side away from basket 11 so as to confine and guide the liquid to the sides, which is discharged onto the wings from the basket. Wings 161 are also provided with trough members 161c located on the undersides thereof facing basket 11. As basket 11 approaches wings 161, lip 11b slides under ledges 161b, as shown in FIGS. 26 and 27.

Basket 11 is then tilted upwardly, in a manner similar to that described above in connection with the operation of the unloader, to discharge the liquid contents onto wings 161 within the confined volume established by forward wing walls 161a, as shown in FIG. 28. The basket inner wall adjacent to the basket's lip 11b is pressed upward as tightly as possible against the matching under surfaces of wing ledges 161b to form a liquid seal, and trough member 161c serve to catch any liquid which may escape through this seal and convey it away in the desired manner. The inner end faces of wings 161 are lined with liquid seal materials so that upon pivoting up to the horizontal both wing ends will compress the material, becoming liquid-tight.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. Apparatus for unloading a material carrier having a platform carried on a supporting structure comprising platform support members with base extensions, the platform support members being pivotally connected to the platform and the pivotal connections being slidable along the platform support members within predetermined limits, the upper portions of the base extensions being connected together in hinged relation, whereby the platform is supported in a horizontal position and can be tilted toward the vertical to rest stabilized upon a portion of the base extensions, causing the platform support members and the base extensions to move closer together along their lengths, said apparatus comprising:

a ramp having a portion positioned to receive one of the carriers;
 first stop means secured to said ramp for engaging the base extensions of the carrier for applying force to the base extensions;
 means for producing relative movement between said ramp and the carrier after positioning of the carrier thereon;
 means for applying force to the top of the platform during said relative movement between said ramp and the carrier, whereby the platform is tilted toward the vertical to discharge the contents thereof; and
 means for releasing the carrier from the ramp after discharge of the carrier contents.

2. Apparatus for unloading a material carrier having a basket carried on a supporting structure including front and rear base members, and central and rear basket support members, the basket being pivotally supported on the central and rear basket support members and being slidably connected to the rear basket support members, the basket being tiltable from a generally horizontal position toward the vertical by applying force to the top of the front of the basket and to the lower ends of the rear base members, the basket pivoting about the upper ends of the central basket support members and the upper portions of the rear basket support members which slide downwardly through rear basket pivot means as the front base members pivot toward the rear base members, said apparatus comprising:

a ramp having an elevatable portion positioned to receive one of the carriers;
 first stop means secured to said ramp for engaging the rear base members of the carrier and for applying force to the rear base members;
 means for elevating said ramp after positioning of the carrier thereon;
 means for applying force to the top of the carrier basket during elevation of said ramp, whereby the basket is tilted toward the vertical to discharge the contents thereof;
 means for lowering said ramp from its elevated position; and
 means for releasing the carrier from said ramp.

3. Apparatus in accordance with claim 2 including means to receive the discharged contents of the carrier basket.

4. Apparatus in accordance with claim 2 in which said means for restraining the top of the carrier basket includes a platform which can receive the discharged contents of the carrier basket.

5. Apparatus in accordance with claim 4 in which said platform includes ledges adapted to fit over and engage the top of the front of the carrier basket for applying the restraining force to the top of the carrier basket.

6. Apparatus in accordance with claim 4 in which said platform comprises a pair of wing members which are movable to form said platform, and which are movable after discharge of the basket contents to free the basket and carrier for release off said ramp.

7. Apparatus in accordance with claim 6 in which said pair of wing members includes ledges on each of said wing member adapted to fit over and engage the top of the front of the carrier basket for applying the restraining force to the top of the carrier basket.

8. Apparatus in accordance with claim 6 including a motive power source for moving said wing members, and wing stop means to restrain said wing members in position forming said platform.

9. Apparatus in accordance with claim 8 including means for disengaging said wing stop means to permit said motive power source to move said wing members free of the basket and carrier.

10. Apparatus in accordance with claim 2 including second stop means for engaging the front base members of the carrier when the basket is tilted toward the vertical position, and for restraining the front base members relative to the rear base members, whereby the carrier can be released from said ramp with the basket in the tilted position.

11. Apparatus in accordance with claim 2 in which said first stop means includes pivotal lever arm means having first ends which engage said rear base members; and trigger arm means engageable by said lever arm means as said ramp is lowered for pivoting said lever arm means clear of the rear base members to thereby release the carrier.

12. Apparatus in accordance with claim 11 including a platform operatively connected to said trigger arm means for receiving the discharged contents of the basket, said trigger arm means being first engaged by said lever arm means during lowering of said ramp to remove said platform from the path of the carrier.

13. Apparatus in accordance with claim 12 in which said platform comprises a pair of wing members which are movable from a first position to a second position to form said platform as said ramp is elevated and which are movable from said second position to a third position by engagement of said lever arm means with said trigger arm means to permit the carrier to be released.

14. Apparatus in accordance with claim 13 including wing stop means movable to a primary position to maintain said wing members in said second position to form said platform, and movable to a secondary position by engagement of said lever arm means with said trigger arm means to free said wing members for movement to said third position.

15. Apparatus in accordance with claim 14 including first cable means for moving said wing members and second cable means connected to said trigger arm means and to said wing stop means for controlling said wing stop means.

16. Apparatus in accordance with claim 15 in which said first cable means is connected to a second end of said lever arm means.

17. Apparatus in accordance with claim 16 including a motive power source for applying tension to said first cable means to first move said wing members from said first position to said second position and then to elevate a portion of said ramp through said second end of said lever arm means.

18. Apparatus in accordance with claim 11 including trigger means engageable by the carrier as it is released from said ramp for pivoting said lever arm means clear of said trigger arm means, whereby said ramp portion remains elevated until carrier is released off ramp.

19. Apparatus in accordance with claim 2 including second stop means secured to said ramp for engaging the front base members of the carrier.

20. Apparatus in accordance with claim 19 in which said second stop means include pivotal lever arm means having first ends engageable with the front base members of the carrier.

21. Apparatus in accordance with claim 20 in which said first ends are pivoted to extend through openings in said ramp to engage said front base members.

22. Apparatus in accordance with claim 20 in which said pivotal lever arm means include second ends; and
means engageable with said second ends for pivoting said pivotal lever arm means to engage the front base members.

23. Apparatus in accordance with claim 22 including a selector lever which is movable to engage said second ends of said pivotal lever arm means during elevation of said ramp to cause pivoting of said pivotal lever arm means.

24. Apparatus for unloading material, comprising:
a carrier having a platform carried on a supporting structure comprising platform support members with base extensions, said platform support members being pivotally connected to said platform and the pivotal connections being slidable along said platform support members within predetermined limits, the upper portions of said base extensions being connected together in hinged relation, whereby said platform is supported in a horizontal position and can be tilted toward the vertical to rest stabilized upon a portion of said base extensions, causing the said platform support members and said base extensions to move closer together along their lengths;
a ramp having a portion positioned to receive one of said carriers;
first stop means secured to said ramp for engaging said base extensions of said carrier for applying force to said base extensions;
means for producing relative movement between said ramp and said carrier after positioning of said carrier thereon;
means for applying force to the top of said platform during said relative movement between said ramp and said carrier, whereby said platform is tilted toward the vertical to discharge the contents thereof; and
means for releasing said carrier from the ramp after discharge of the carrier contents.

25. A method for unloading a material carrier having a basket carried on a supporting structure including front and rear base members and central and rear basket support members, the basket being pivotally supported on the central and rear basket support members and also being slidably connected to the rear basket support members, the basket being tiltable from a generally horizontal position toward the vertical by applying force to the top of the basket and to the lower ends of the rear base members, the basket pivoting about the upper ends of the central basket support members and upper portions of the rear basket support members which slide downwardly through rear basket pivot means as the front base members pivot toward the rear base members, said method comprising the steps of:
applying a restraining force to the rear base members of the carrier;
applying a restraining force to the top of the carrier basket whereby the basket is tiltable from the generally horizontal toward the vertical to discharge the contents thereof;
applying relative forces to the combination of said rear base members and said top of the carrier basket whereby they move closer together and said basket tilts toward the vertical to discharge its contents; and
removing said restraining forces from the rear base members and top of carrier basket to release the carrier.

26. The method of claim 25 including the step of returning the carrier basket to the generally horizontal position prior to releasing the carrier.

27. The method of claim 25 including the step of maintaining the carrier basket in the position tilted toward the vertical when the carrier is released.

28. The method of claim 25 including the step of receiving the carrier onto unloader apparatus at one side thereof and releasing the carrier from another side.

29. The method of claim 28 including the step of releasing the carrier so it is gravitationally released from unloader apparatus.

30. The method of claim 25 including controllably applying said relative forces causing the rear base members and the top of the carrier basket to move closer together at a desired rate to controllably tilt the basket and control the rate of discharge of the basket contents.

31. The method of claim 25 for pivoting the basket from the tilted position to the horizontal position by pulling back on the rear basket support members in an arc-like motion and to also separate the carrier from a preceding carrier.

References Cited

UNITED STATES PATENTS 2,776,843  1/1957  Just et al. ________ 280—33.99
3,205,976  9/1965  Stollman __________ 186—1

ROBERT G. SHERIDAN, Primary Examiner.

U.S. Cl. X.R.

186—1; 214—152; 280—33.99